(No Model.)
E. C. NEWTON.
ANIMAL TIE.
No. 262,306. Patented Aug. 8, 1882.
Fig. 1.
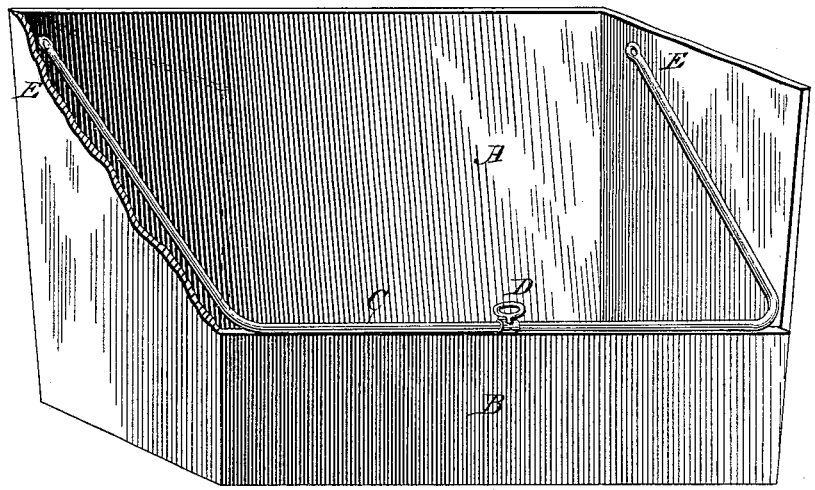
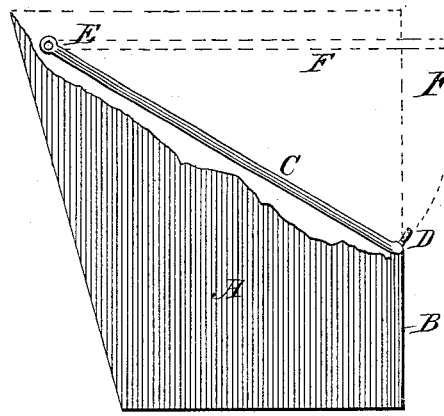
Fig. 2.
Witnesses.
D. C. Newton
H. K. Wolcott
Inventor.
Earl C. Newton

UNITED STATES PATENT OFFICE.

EARL C. NEWTON, OF BATAVIA, ILLINOIS.

ANIMAL-TIE.

SPECIFICATION forming part of Letters Patent No.262,306, dated August 8, 1882.

Application filed March 7, 1882. (No model.)

*To all whom it may concern:*

Be it known that I, EARL C. NEWTON, of Batavia, in the county of Kane and State of Illinois, have invented certain Improvements in Animal Fastenings or Ties, of which the following is a specification.

The invention relates more particularly to the fastening of cattle in stables for the purpose of keeping them clean, it being fastened close under the neck with chain or strap. It forces them back when standing and draws them forward when preparing to lie down, and gives them perfect freedom of their heads at all times. The fastener or tie is made in such shape that it may be fastened to the side of barn, in stall, or to a manger, as shown in drawings.

Figure 1 is a perspective view of a manger with one end partly taken away. A is the manger; B, the front of manger, which forms a rest for the fastener or tie when not in use. C is the fastener or tie, which is made of iron or other material, and in such shape that it may be hinged or pivoted to side of barn, stall, or manger, as shown at E E, so that the other portion may be raised and lowered by the motion of the animal's head. D is a swivel in which to fasten the chain or strap that goes around the animal's neck, allowing its head to be turned in any direction.

Fig. 2 is a sectional end view of manger, showing the position of fastener or tie C when the animal is lying down. The dotted lines F show the position of the fastener or tie C when the animal is standing. The dotted line G shows that as the fastener or tie C is raised it carries the swivel D farther from the place where it is hinged or pivoted, thus crowding the animal back while standing.

I claim as my invention—

An improved animal-fastener consisting of the swinging tie C, furnished with the swivel D for receiving a strap, cord, or chain, all adapted to be hinged or pivoted to a stall or manger, substantially as shown, for the purpose set forth.

EARL C. NEWTON.

Witnesses:
FRED. H. BEACH,
FRED H. DOTY.